Inventor:
Paul VOSSIECK

By *Spencer & Kaye*
Attorneys

United States Patent Office 3,470,602
Patented Oct. 7, 1969

3,470,602
FLEXIBLE SHAFT COUPLING
Paul Vossieck, Burscheid, Germany, assignor to Goetzewerke Friedrich Goetze, A.G., Burscheid, Germany
Filed Jan. 16, 1968, Ser. No. 698,249
Claims priority, application Germany, Jan. 20, 1967,
G 49,042
Int. Cl. F16d 3/52
U.S. Cl. 29—436                              1 Claim

ABSTRACT OF THE DISCLOSURE

A flexible shaft coupling, suitable for use as a torsional vibration balancer in the clutch disc of a motor vehicle, which has a number of column-like springs made from an elastic material, such as rubber, connected together to form a polygonal ring. The springs are arranged in the ring such that the projections of each two adjoining ones thereof on a plane drawn through the axis of the coupling form an angle between them which is less than 180°.

BACKGROUND OF THE INVENTION

The present invention relates to a flexible shaft coupling which may be used, for example, as a torsional vibration balancer in the disc clutch of a motor vehicle. More particularly, the present invention is concerned with the specific design of a flexible shaft coupling having a number of columnar springs made from an elastic material such as rubber, connected together to form a polygonal ring.

Flexible shaft coupling consisting of a number of polygonally arranged columnar rubber springs are already well known in the art. These couplings have metal fittings (e.g., adapter sleeves) vulcanized in between the ends of the rubber springs which, for example, in the case of the adapter sleeves, are alternately connected by means of screws or rivets with the claws or dogs of the driving and the driven shaft ends.

Flexible shaft couplings of this type are frequently built into the drive train of motor vehicles as torsional vibration balancers in entrainer clutch discs. A hub spider, which is concentrically arranged inside of the polygonal rubber ring serves, in such cases, as the driven member. Every second metal fitting embedded between consecutive rubber springs is replaced by an arm which projects radially out of the spider hub, star-fastion. The other metal fittings embedded in the polygonal ring are fastened to a housing which consists of two half shells.

In order to improve the vibration damping properties as well as the durability of the rubber springs, it is likewise known to secure the rubber springs in the housing of the torsional vibration damper under stress. The rubber element is, to this end, first manufactured somewhat larger in diameter than the vibration damper housing and then compressed into the housing usually by means of a tension band wrapped around the outside.

More particularly, because the diameter of the polygonal rubber element is made larger than the diameter of the torsional vibration damper housing, it is first necessary to press the rubber springs, which are not yet fastened to the arms of the hub spider, radially inward before fitting them into the housing. This clamping process to reduce the diameter of the rubber element prior to assembly in the housing can be accomplished by means of some special-purpose equipment and/or tension band which, after assembly, must be removed again. It is necessary here to clamp down the rubber elements uniformly in the radial direction so as to insure that the metal fittings which are vulcanized into the rubber will line up with their respective connectors in the torsional vibration balancer housing.

SUMMARY OF THE INVENTION

An object of the present invention is to design a flexible shaft coupling having columnar springs arranged in a polygon ring which can be conveniently prestressed and assembled without the use of special tools or devices.

This, as well as other objects which will become apparent in the discussion that follows, is achieved, according to the present invention, by arranging the rubber springs in the polygonal ring such that, in their unstressed state, the projections of each two adjoining ones of the springs on a plane drawn through the axis of the coupling form an angle between them of less than 180°. This axial deflection of the rubber springs permits them to have lengths which are greater than the lengths of their projections on a radial plane drawn transverse to the coupling axis.

A coupling which is constructed in the manner prescribed by the present invention may be installed between two shaft end flanges, or, as a torsional vibration balancer, in a corresponding coupling housing, with its internally vulcanized metal fittings axially displaced so that the average separation between all adjoining fittings will be at a minimum. If this is done, the length of its individual rubber springs will be shortened an optimum amount, and placed under a prescribed prestress.

DESCRIPTION OF THE PREFERRED EMBODIMENTS

Figure 1:
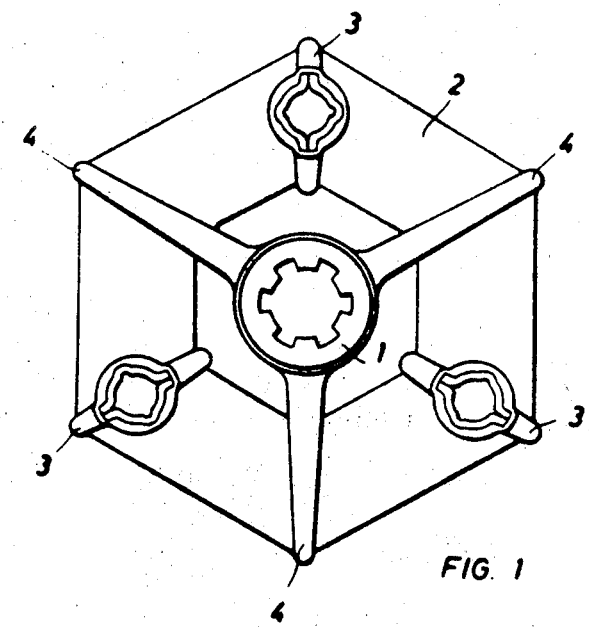
FIGURE 1 is a front elevational view of a preferred embodiment of a flexible shaft coupling having six rubber springs arranged according to the present invention.

Referring now to the drawings, there is shown in FIGURE 1 a flexible shaft coupling, according to a preferred embodiment of the present invention, consisting essentially of a hub spider 1 and columnar-shaped rubber springs 2. Adapted sleeves 3 and the arms 4 of the hub spider 1 are alternately vulcanized between consecutive ones of the rubber springs 2.

Figure 2:
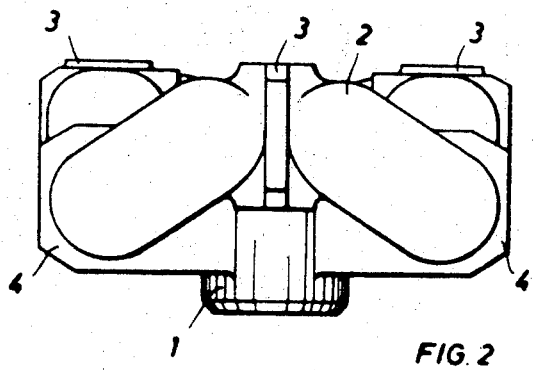
FIGURE 2 is a top view of the flexible shaft coupling of FIGURE 1.

The top view of the coupling which may be seen in FIGURE 2 shows how the rubber springs 2 are inclined outward in the axial direction. The plane determined by the center points of the three adapter sleeves 3 is displaced axially from the parallel plane formed by the center points of the three hub arms 4. When such a coupling is assembled or built into a housing, the adapter sleeves 3 are compressed axially backward until the plane formed by their centers lies in the plane formed by the centers of the hub arms 4. The desired prestressing of the individual rubber columns is thus achieved by the resultant shortening of the rubber springs 2.

In addition to the achievement of the object of the invention set forth above, the present invention obtains the advantage that the nests in the transfer molds in which the rubber springs are produced may be of smaller diameter than would be necessary were the couplings radially increased in size, as in the prior art. This reduction in diameter thus leads to savings in the cost of production.

The flexible shaft couplings according to the present invention also are considerably easier to assemble since the necessary axial displacement is easier to accomplish than the radially-directed clamping required with the couplings of the prior art.

The present invention also applies to coupling members which have no hub spider, but only adapter sleeves or the like vulcanized between the individual rubber springs. If this type of coupling is inserted between two shaft ends arranged at an angle with respect to each other, the axial deflection of the rubber springs not only does not effect an increase in the stress, but it operates to reduce the compressive stresses which are caused by the shafts.

It will be understood that the above description of the present invention is susceptible to various modifications, changes, and adaptations, and the same are intended to be comprehended within the meaning and range of equivalents of the appended claim.

I claim:

1. A method of making a flexible shaft coupling having a plurality of column-like springs made from an elastic material connected together to form a polygonal ring, said method comprising the steps of:

(a) arranging said springs in a polygon such that the projections of each two adjoining ones of said springs upon a plane drawn through the axis of said coupling form an angle between them which is less than 180°; and (b) flattening said polygon such that the projections of each two adjoining ones of said springs upon a plane drawn through the axis of said coupling form a 180° angle between them.

References Cited

UNITED STATES PATENTS

| | | | |
|---|---|---|---|
| 2,127,942 | 8/1938 | Schmidt | 64—14 |
| 3,238,742 | 3/1966 | Martorana | 64—11 |
| 3,353,373 | 11/1967 | Schumacher et al. | 64—11 |

FOREIGN PATENTS

| | | |
|---|---|---|
| 557,424 | 11/1943 | Great Britain. |

HALL C. COE, Primary Examiner

U.S. Cl. X.R.

64—11, 14